(12) United States Patent
Whyte et al.

(10) Patent No.: US 12,466,337 B2
(45) Date of Patent: Nov. 11, 2025

(54) PUSH-IN AND SNAP-ON SEALS

(71) Applicant: B/E Aerospace, Inc., Winston-Salem, NC (US)

(72) Inventors: Nicole Sluder Whyte, Gilbert, AZ (US); Chirag Krishnamurthy, Karnataka (IN); Sourabh Vijaya Manae, Bengaluru (IN); Gururaja Nekkar, Bangalore (IN); Maxime Dempah, Atlanta, GA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 96 days.

(21) Appl. No.: 18/614,279

(22) Filed: Mar. 22, 2024

(65) Prior Publication Data

US 2025/0196784 A1    Jun. 19, 2025

(30) Foreign Application Priority Data

Dec. 15, 2023  (IN) .............................. 202311085805

(51) Int. Cl.
| | |
|---|---|
| *B60R 13/02* | (2006.01) |
| *B60R 13/06* | (2006.01) |
| *F16J 15/06* | (2006.01) |
| *B60J 10/30* | (2016.01) |

(52) U.S. Cl.
CPC .......... *B60R 13/0206* (2013.01); *B60R 13/06* (2013.01); *B60J 10/30* (2016.02); *F16J 15/061* (2013.01); *Y10S 277/921* (2013.01)

(58) Field of Classification Search
CPC ....... B60J 10/30; B60J 10/36; B60R 13/0206; B60R 13/06; F16J 15/027; F16J 15/061; Y10S 277/921; F16B 5/123
See application file for complete search history.

(56) References Cited

U.S. PATENT DOCUMENTS

| | | | | |
|---|---|---|---|---|
| 3,230,592 | A | * | 1/1966 | Hosea ...................... B60J 10/30 411/509 |
| 4,147,006 | A | * | 4/1979 | Kruschwitz ............ B60J 10/265 52/716.7 |
| 4,700,525 | A | * | 10/1987 | Nieboer ................... B60J 10/70 52/204.591 |
| 4,715,095 | A | * | 12/1987 | Takahashi ............... F16B 5/065 24/297 |
| 6,321,490 | B1 | | 11/2001 | Vance |
| 10,323,749 | B2 | | 6/2019 | Maloney et al. |
| 10,578,146 | B2 | | 3/2020 | Etling et al. |

(Continued)

*Primary Examiner* — Nicholas L Foster
(74) *Attorney, Agent, or Firm* — Suiter Swantz IP

(57) ABSTRACT

A seal assembly is disclosed. The seal assembly may include a seal with a seal body. The seal body may include a seal bottom surface and a cavity along a lengthwise direction of the seal body. The seal assembly may include a fastener with a shank disposed along an axis, a stem protruding up from the shank and disposed along the axis, and an anchor coupled to the stem. The anchor may include one or more anchor arms, each with a pivot and coupled to an arm lever located at a distal end of the fastener. Each anchor arm may be configured to rotate around the pivot between an uncoupled position and a coupled position upon application of a longitudinal force to the arm lever, causing an extendable portion of the anchor arm to rotate radially outwards relative to the axis.

20 Claims, 8 Drawing Sheets

(56) References Cited

U.S. PATENT DOCUMENTS

2003/0075878 A1\* 4/2003 Sehr .................. F16B 5/123
    277/630
2007/0077375 A1 4/2007 Honda et al.

\* cited by examiner

PUSH-IN AND SNAP-ON SEALS

CROSS-REFERENCE TO RELATED APPLICATIONS

The present application claims the benefit of India Provisional Patent Application 20/231,1085805, filed Dec. 15, 2023, titled PUSH-IN AND SNAP-ON SEALS, naming Nicole Sluder Whyte, Chirag Krishnamurthy, Sourabh Vijaya Manae, Gururaja Nekkar, and Maxime Dempah as inventors, which is incorporated herein by reference in the entirety.

TECHNICAL FIELD present disclosure relates generally to seal assemblies configured to seal areas and the like (e.g., seal gaps), and, more particularly, to fastening of seal assemblies.

BACKGROUND

Seals are used across interiors (e.g., to block airflow in gaps of aircraft floors, monuments, etc.). These seals are sometimes attached with a retainer. Seals come in various shapes, sizes and profiles that meet the requirements in terms of closing the gaps and cabin isolation. These seals may be delivered as standard lengths or cut to size. However, the retainers may make up a substantial portion (e.g., around half) of weight and cost of the seal system.

Therefore, there may be a desire for a seal system that improves upon these issues.

SUMMARY

A seal assembly is disclosed in accordance with one or more illustrative embodiments of the present disclosure. In one illustrative embodiment, the seal assembly may include a seal comprising a seal body. The seal body may include a seal bottom surface and a cavity along a lengthwise direction of the seal body. In another illustrative embodiment, the seal assembly may include a fastener. The fastener may include a shank disposed along an axis, a stem protruding up from the shank and disposed along the axis, and an anchor coupled to the stem. The anchor may include one or more anchor arms. Each anchor arm may include a pivot and be coupled to an arm lever located at a distal end of the fastener. Each anchor arm may be configured to rotate around the pivot between an uncoupled position and a coupled position upon application of a longitudinal force to the arm lever, causing an extendable portion of the anchor arm to rotate radially outwards relative to the axis.

In a further aspect, the one or more anchor arms may include a first anchor arm and a second anchor arm. In another illustrative embodiment, the first anchor arm may be symmetrically located on an opposing side of the fastener and the axis relative to the second anchor arm. In another illustrative embodiment, the first anchor arm may be located 180 degrees from the second anchor arm relative to the axis. In another illustrative embodiment, the anchor may further include a cap configured to couple the anchor to the stem. In another illustrative embodiment, the extendable portion may be parallel to the axis when in the uncoupled position. In another illustrative embodiment, the grooves may be configured to align with and removably mate to ribs of the seal. In another illustrative embodiment, the one or more anchor arms may be configured to removably nest in an anchor recess disposed in a lengthwise direction of a seal. In another illustrative embodiment, the fastener may further include a tool rotatable portion disposed between the stem and the shank and configured to receive a wrench. In another illustrative embodiment, the shank may include threads.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
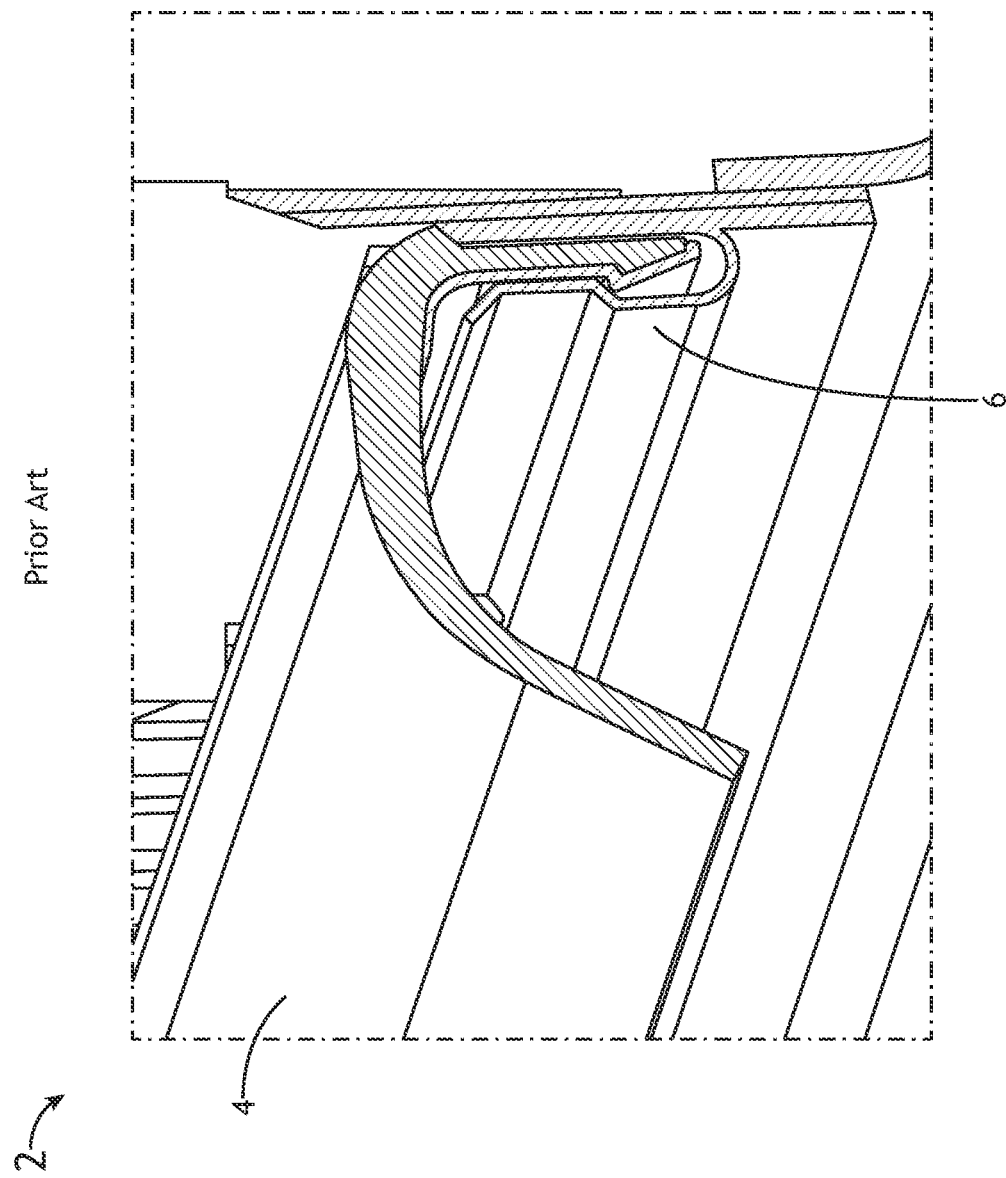
FIG. 1 is a seal system with a retainer that runs the entire length.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Broadly speaking, embodiments of the inventive concepts disclosed herein are directed to a seal assembly using stem fasteners to mount seals with benefits that may include, but are not necessarily limited to, being relatively lightweight, low-cost, and easy to install compared to other systems (e.g., systems with lengthwise retainers for mounting seals). For example, lengthwise retainers may need to be hard (e.g., aluminum or plastic) for strength and extend most or a substantial portion of the length of the seal, which may add weight and cost to the assembly. It is contemplated that embodiments herein with stem fasteners having pop-out anchor arms that nest in seal cavities may require less material, cost less, and weigh less. Especially in aircraft, weight itself is a major factor in cost (e.g., fuel cost) over the lifetime of the vehicle and therefore reducing the weight may provide significant cost savings compared to seal solutions such as lengthwise retainers.

In at least some embodiments, the seal attachment enables a one-piece seal (e.g., only one lengthwise piece without a retainer). The expanding anchor of the fastener utilize a leverage principle to deploy the anchor arms, which reduce bowing of the seal when installed. The seal attachment provides a close, tight fit to close the gap between structures while also providing opportunities for reduced weight and cost through a reduction in assembly component material.

FIG. 1 illustrates a seal system 2 with a retainer 6 that runs the entire length and is coupled to a blade style seal 4. This seal retaining method may be less beneficial compared to stem fasteners described herein.

For retainer seals, an extruded seal 4 may be slid into a plastic/metallic retainer 6 that holds the seal 4 in place. These retainers may be either bonded directly using adhesives or fastened to interior monuments of an aircraft. Retainers may be permanently attached to the interior monuments (e.g., seat panels, floor gaps, galley gap closeouts, etc.).

Although FIG. 1 illustrates an example of a retainer style seal, any aspect (e.g., component, assembly, description, and/or the like) of FIG. 1 or descriptions thereof may be in accordance with one or more embodiments herein. For example, embodiments herein may be coupled to a monument.

In embodiments, a seal may include any soft rubber-like material. In embodiments, the seal might be derived from a polyurethane material. In embodiments, the seal may comprise a silicone-based material. In embodiments, the seal may include a thermoplastic rubber material.

Figure 2A:
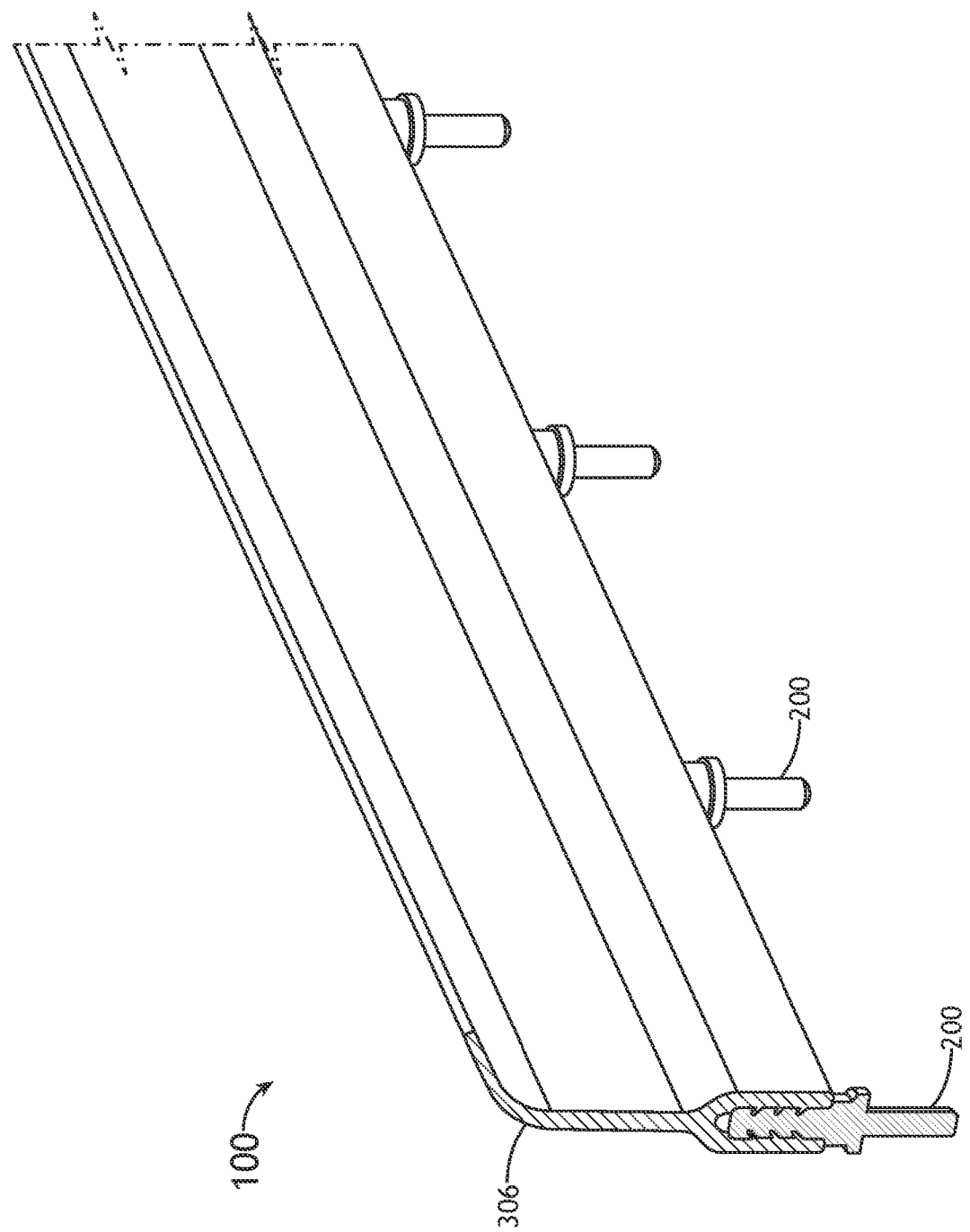
FIG. 2A is a view of a seal assembly including a (blade) seal snapped onto fasteners spaced out from each other, in accordance with one or more embodiments of the present disclosure.

FIG. 2A illustrates a (cutaway) view of a seal assembly 100 including a seal 300 snapped onto fasteners 200 spaced out from each other, in accordance with one or more embodiments of the present disclosure.

For example, the fasteners 200 may include threads on a shank, like threaded bolts in a way, configured to be installed in a series of threaded holes.

The seal 300 may include any seal known in the art or disclosed herein. For example, the seal 300 may include (or be) a blade seal 300 as shown. For instance, a blade seal 300 may include an elongated flexible portion bent at one end, and a cavity at the other end.

Figure 2B:
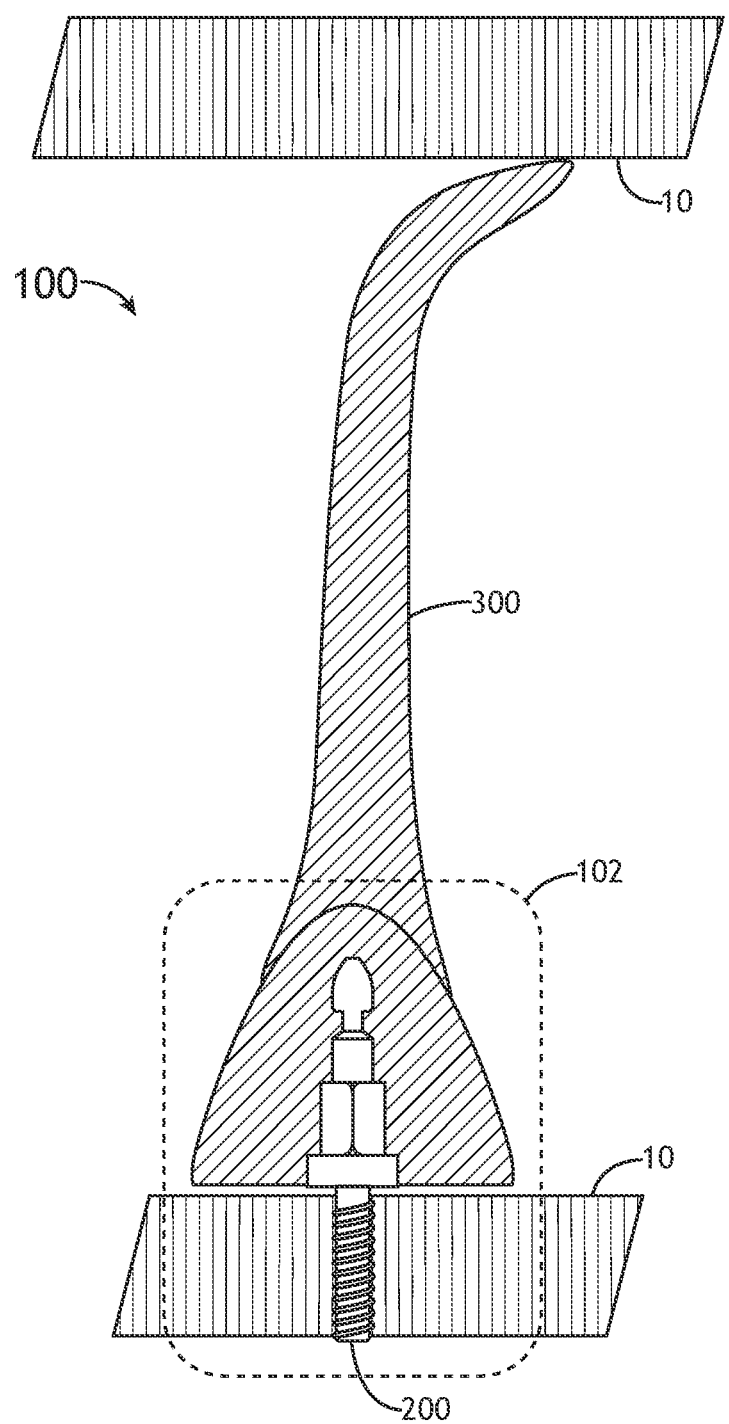
FIG. 2B is a conceptual cross-sectional front view of the seal assembly installed between two monument panels, in accordance with one or more embodiments of the present disclosure.

FIG. 2B illustrates a conceptual cross-sectional front view of the seal assembly 100 installed between two monument panels 10, in accordance with one or more embodiments of the present disclosure.

As shown, the seal attachment 102 may be located on one side of the seal assembly 100. For example, a seal 300 may be sized/selected to span a gap between monuments 10 (or any other surfaces), where the fasteners 200 are installed on one monument 10, and the seal 300 is coupled to the fasteners 200 and closes-out the gap between the monuments 10.

Figure 3A:
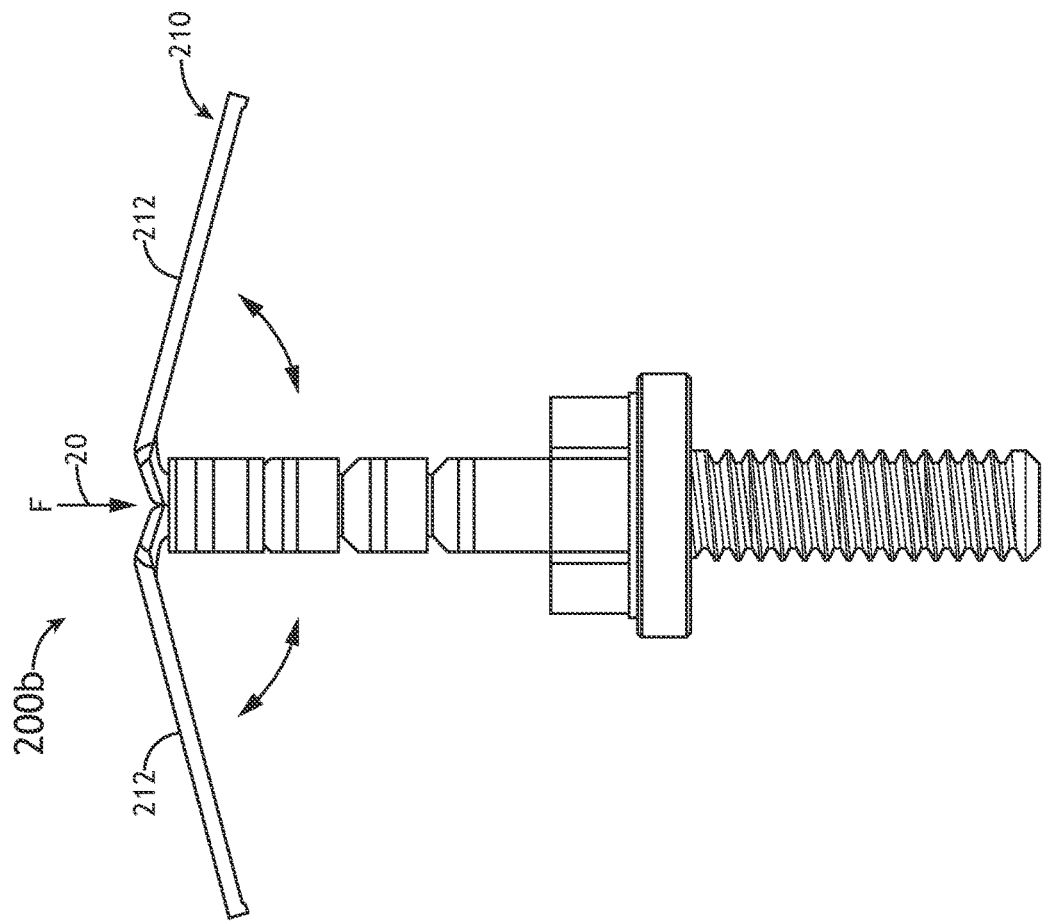
FIG. 3A is two front views of fasteners, including an anchor in an uncoupled position and an anchor in a couplable/extended position, in accordance with one or more embodiments of the present disclosure.

FIG. 3A illustrates two front views of fasteners 200, in accordance with one or more embodiments of the present disclosure. The fastener 200a on the left is in an uncoupled position and the fastener 200b on the right is in a coupled/couplable/extended position, where the anchor arms 212 of the anchor 210 of the fastener 200b are extended outwards.

The fasteners 200 may advantageously include anchor arms 212 that extend out when the seal 300 is snapped onto and coupled to the fastener 200. The anchor arms 212 may extend lengthwise to provide added support to the seal 300 along the length so that a side force between two fasteners 200 is less able to deform the seal 300. The anchor arms 212 may also aid in locking the seal 300 in place.

Each anchor arm 212 may be configured to rotate around a pivot between an uncoupled position and a coupled position upon application of a longitudinal force 20 to an arm lever at the distal end of the fastener 200. The arm lever 220 may be configured to be moved/rotated by the longitudinal force 20 longitudinally inwards relative to the axis (e.g., downwards and towards a center of the fastener 200 as shown). The arm lever may be considered to be coupled to and/or be a part of the anchor arms 212. The arm lever may be configured to rotate an extendable portion 228 of the anchor arm radially outwards relative to the axis as shown by the coupled/couplable position of fastener 200b.

Figure 3B:
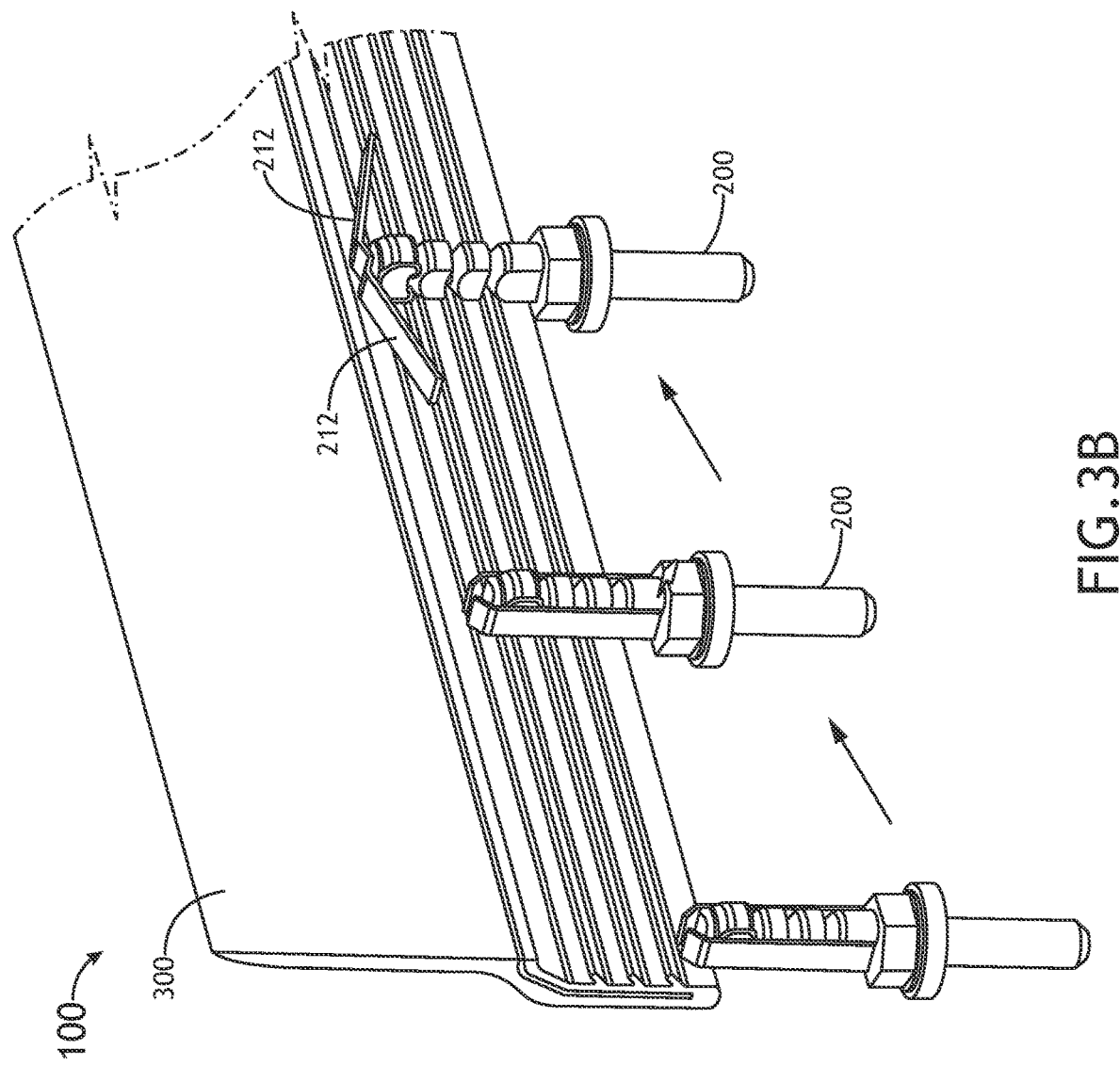
FIG. 3B is a cutaway view of a seal showing the anchor arms of a fastener being extended as the seal is pushed onto the fastener, in accordance with one or more embodiments of the present disclosure.

FIG. 3B illustrates a cutaway view of the inside of a seal 300 showing the anchor arms 212 of a fastener 200 being extended as the seal 300 is pushed onto the fastener 200, in accordance with one or more embodiments of the present disclosure.

Figure 4:
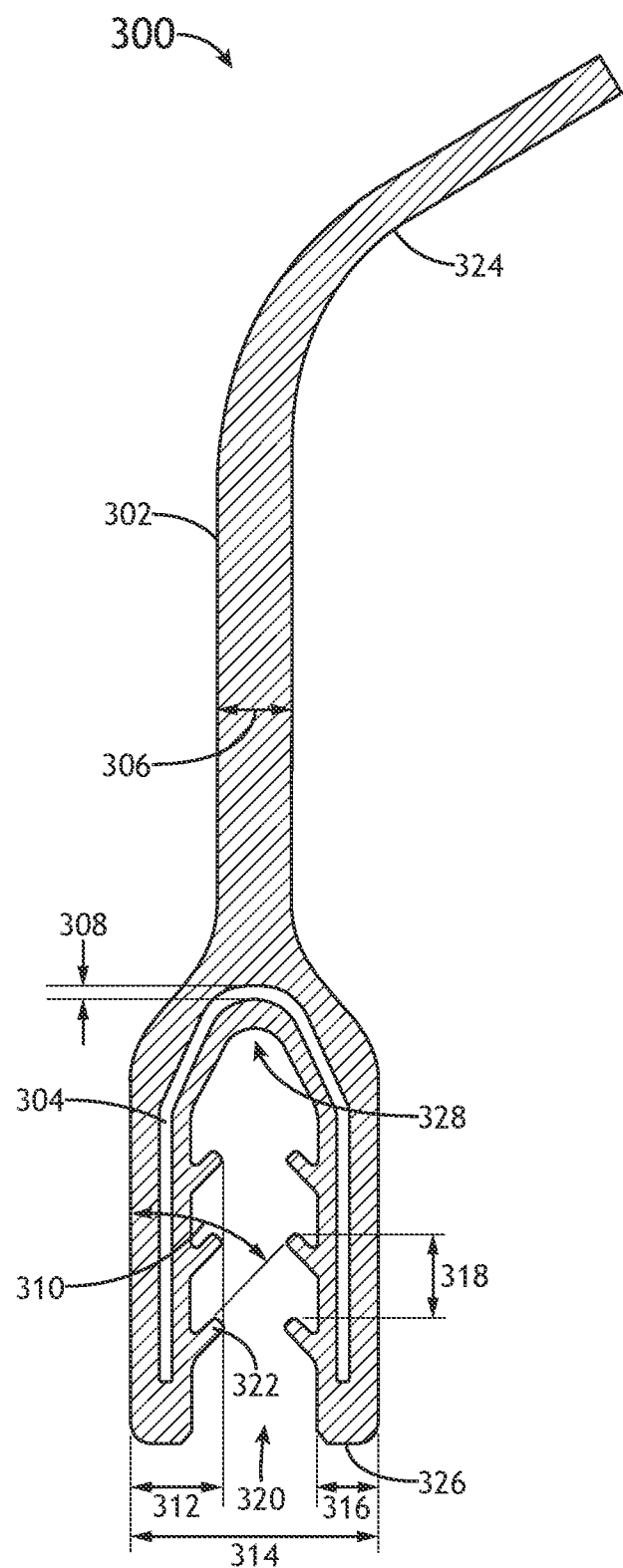
FIG. 4 is a seal, in accordance with one or more embodiments of the present disclosure.

FIG. 4 illustrates a seal 300, in accordance with one or more embodiments of the present disclosure.

The seal 300 may include a seal body 302. The seal body 302 may include a seal bottom surface 326 and a cavity 320 (at the bottom) along a lengthwise direction of the seal body 302.

The seal body 302 may be coupled and enclosing a reinforcement channel 304, such as may be co-extruded with a seal body 302. For instance, the seal body 302 may include plastic and the reinforcement channel 304 may include a sturdier material such as metal (e.g., aluminum; steel).

The grooves 520 of the stem 508 may be configured to align with and removably mate/couple to ribs 322 of the seal 300 (thereby providing a removable lock, and retaining of the seal 300 to hold it in place). The seal 300 may therefore be removably couplable to the fasteners 200. The number of ribs 322 on each side of the cavity 320 may match the number of grooves 520. For example, three or more ribs 322 (on each side) may align with three or more (corresponding) grooves 520.

The cavity 320 may include ribs 322, such as three or more ribs 322 on each side of the cavity 320. The cavity 320 may include a cavity bottom 328, such as may provide the force 20 to the anchors 210 when the seal 300 is pushed on, thereby extending the anchor arms 212.

The seal 300, or components thereof, may include and/or be defined by the following: channel width 308, rib angle 310, rib depth 312, seal width at cavity 314, seal sidewall width at cavity 316, rib spacing 318, width 306 of an elongated (blade) portion, and elongated portion bent end radius of curvature 324. The width 306 of the elongated portion of the seal body 302 may be any width, such as 0.01 inches or more.

Any one of the dimensions for any component herein may be used in any embodiment, individually and/or in combination with multiple or all of any other dimensions. However, such dimensions are not necessarily limiting and a person of skill in the art will understand that concepts and components herein may extend to other dimensions, shapes, configurations and the like. For example, the following dimensions may be used, alone or in combination: within 50% of these dimensions (e.g., 0.03 inches may be understood as between 0.015 to 0.045 inches): a channel width 308 of 0.03 inches, rib depth 312 of 0.20 inches, seal width at cavity 314 of 0.55 inches, seal sidewall width at cavity 316 of 0.14 inches, rib spacing 318 of 0.22 inches, and/or width 306 of an elongated portion of 0.18 inches. In another example, the width 306 of the elongated portion of the seal body 302 may be any width, such as 0.01 inches or more.

Figure 5A:
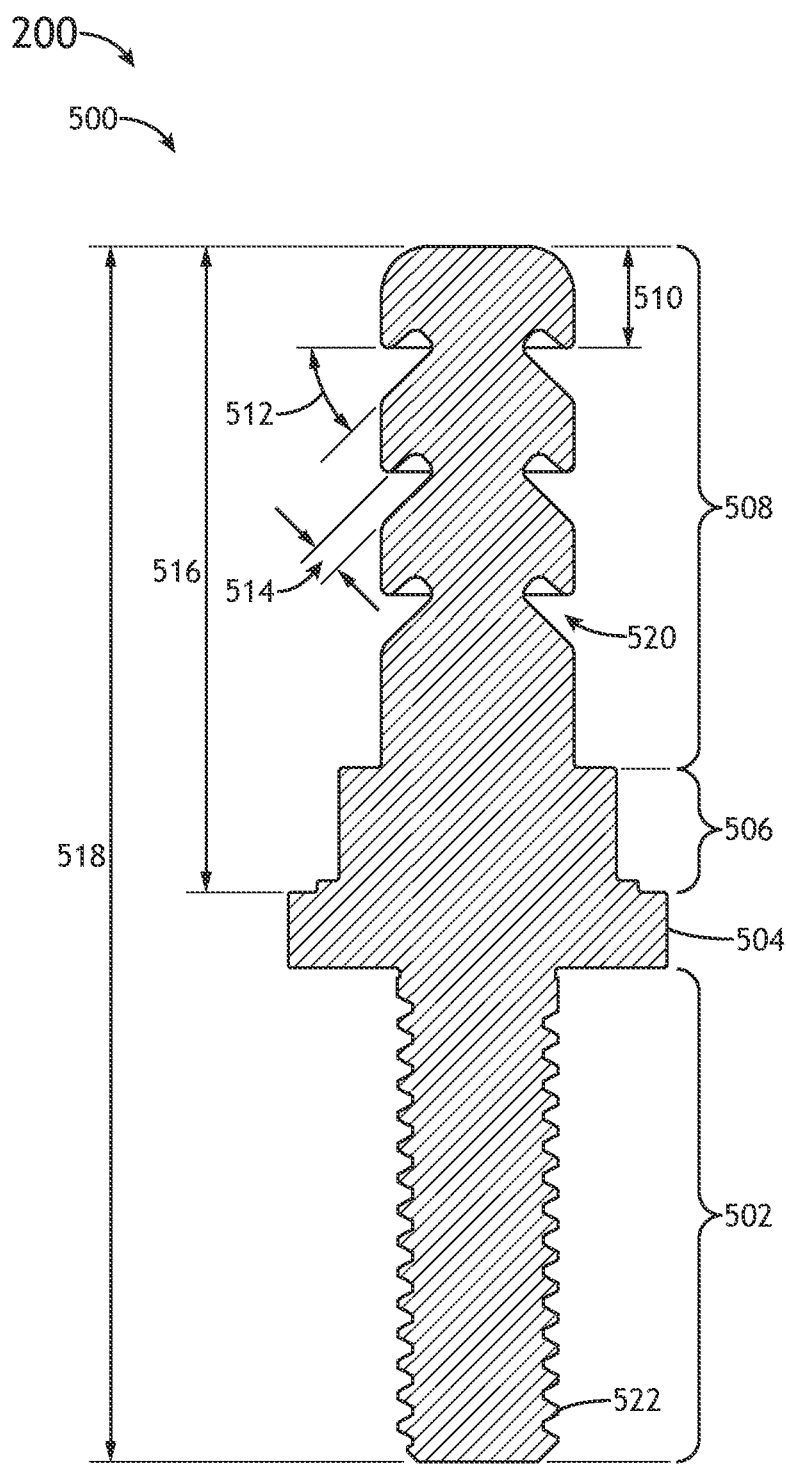
FIG. 5A is a fastener body of a fastener including a stem and a shank, in accordance with one or more embodiments of the present disclosure.

FIG. 5A illustrates a fastener body 500 of a fastener 200 including a stem 508 and a shank 502, in accordance with one or more embodiments of the present disclosure. The stem 508 may be configured to be inserted into the seal 300 and the shank 502 may be configured to be fastened to a surface (e.g., panel with threaded holes). In this way, the fastener 200 allows locking a seal 300 in place relative to a surface.

The stem 508 may protrude up from the shank 502 and may be disposed along the axis 270. The stem 508 may include one or more grooves 520 radially disposed around the axis 270, and the grooves 520 may be configured to receive ribs 322 of the seal 300.

The fastener 200 of the seal assembly 100 may further include a tool rotatable portion 506. The tool rotatable portion 506 may be disposed between the stem 508 and the shank 502. The tool rotatable portion 506 may be configured to receive a wrench. For example, the tool rotatable portion 506 may include flat surfaces, such as a hexagon configuration typically used on a bolt head.

The shank 502 of the seal assembly 100 may include threads 522 as shown, such as for being threaded to corresponding hole internal threads, and tightened down with a tool such as a wrench.

The fastener body 500, or components thereof, may include and/or be defined by the following: mounting surface 504 (e.g., disposed adjacent to the shank 502), total height 518, height 516 above mounting surface 504, groove cutback distance 514, groove cutaway angle 512, and groove spacing 510.

As noted, any one of the dimensions for any component herein may be used in any embodiment, individually and/or in combination with multiple or all of any other dimensions. For example, the following dimensions may be used, alone or in combination: within 50% of these dimensions (e.g., 0.03 inches may be understood as between 0.015 to 0.045 inches): total height 518 of 1.98 inches, height 516 above mounting surface of 1.0 inches, groove cutback distance 514 of 0.04 inches, and/or groove spacing 510 of 0.18 inches. In examples, the groove cutaway angle 512 may be within plus or minus 10 degrees of 45 degrees.

Figure 5B:
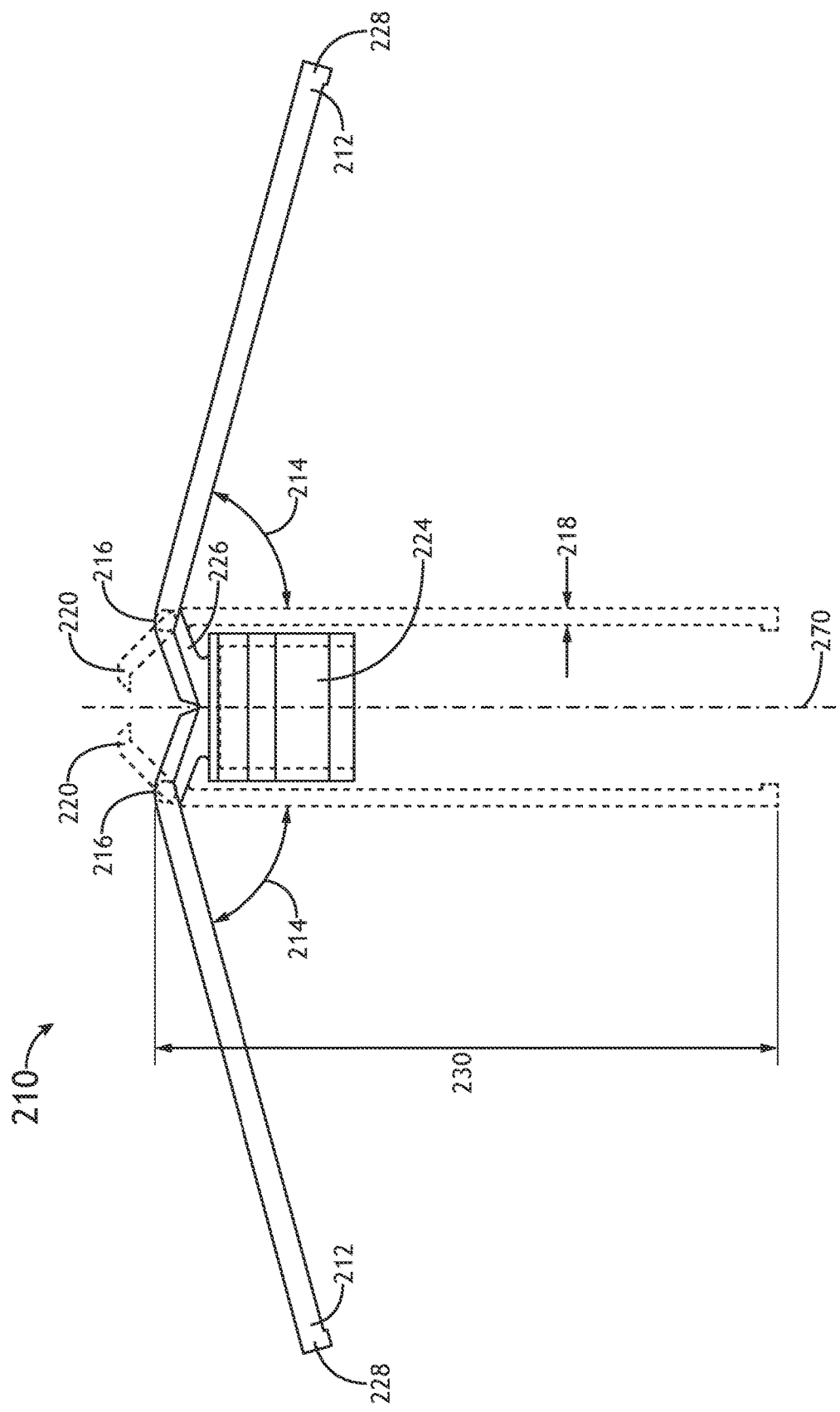
FIG. 5B is an anchor of a fastener including anchor arms in two positions, in accordance with one or more embodiments of the present disclosure.

FIG. 5B illustrates an anchor 210 including anchor arms 212 in two positions (e.g., couplable/extended and uncoupled/non-extended), in accordance with one or more embodiments of the present disclosure.

The anchor 210 may be configured to be rotatable/flexible for extending the anchor arms 212. For example, although not shown in the simplified illustration, a cutback (e.g., V-shaped) cutout just below the pivot 216, on the arm supports 226 may weaken the arm supports 226 such that the arm supports 226 are less thick than the anchor arms 212, but with enough material remaining so the anchor arms 212 are not easily broken off the arm supports 226. For example, just below the pivot 216, the arm supports 226 thickness may be less than one half compared to a thickness of the rest of the arm supports 226, and/or a thickness of the anchor arms 212. The cutout may be in a shape that is pointed such as a V-shape or the like and correspond to angle 214. This may effectively provide a joint of rotation. In embodiments, (not shown) such a joint may be provided using any other methodology, such as a hinge and shaft and/or the like. The anchor 210 may include (e.g., be substantially comprised of) a plastic (e.g., relatively hard plastic) or other material that may be used for a joint.

Each anchor arm 212 may include a pivot 216 and may be coupled to an arm lever 220. The arm lever 220 may be located at a distal end (e.g., top) of the fastener 200. Each anchor arm 212 may be configured to rotate around the pivot 216 between an uncoupled position and a coupled position upon application of a longitudinal force 20 to the arm lever 220 at the distal end. The longitudinal force 20 may be configured to move the arm lever 220 longitudinally inwards relative to the axis 270 and rotate an extendable portion 228 of the arm lever 220 radially outwards relative to the axis 270. The extendable portion 228 may be parallel to the axis 270 when in the uncoupled position.

The arm extended angle 214 may be any angle, such as at least 60 degrees. For example, the arm extended angle 214 may be at least 70 degrees. For example, the arm extended angle 214 may be at least 80 degrees.

An anchor arm length 230 may be any length, such as at least 0.2 inches. For example, the anchor arm length 230 may be at least 0.8 inches. For example, the anchor arm length 230 may be at least 0.99 inches.

An extended portion length 222 may be any length, such as at least 0.7 inches.

An anchor arm thickness 218 may be any thickness, such as at least 0.01 inches, and/or a maximum of 0.20 inches.

The one or more anchor arms 212 of the seal assembly 100 may include a first anchor arm and a second anchor arm. The one or more anchor arms 212 of the seal assembly 100 may be configured to removably nest in an cavity bottom 328 (e.g., see FIG. 4) disposed in and along a lengthwise direction of the seal 300.

The first anchor arm may be symmetrically located on an opposing side of the fastener 200 and the axis 270 relative to the second anchor arm, such as 180 degrees from each other.

The anchor 210 of the seal assembly 100 may further include a cap 224. The cap 224 may be configured to couple the anchor 210 to the stem 508. For example, a rim of the cap 224 may be crimped into a groove of the stem 508 and/or the like.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following:

A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "in embodiments", "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A fastener comprising:
    a shank disposed along an axis;
    a stem protruding up from the shank and disposed along the axis, the stem comprising one or more grooves radially disposed around the axis;
    an anchor coupled to the stem, the anchor comprising:
        one or more anchor arms, wherein each anchor arm comprises a pivot and is coupled to an arm lever, wherein the arm lever is located at a distal end of the fastener, wherein each anchor arm is configured to rotate around the pivot between an uncoupled position and a coupled position upon application of a longitudinal force to the arm lever at the distal end, wherein the longitudinal force is configured to move the arm lever longitudinally inwards relative to the axis and rotate an extendable portion of the anchor arm radially outwards relative to the axis.

2. The fastener of claim 1, wherein the one or more anchor arms comprise a first anchor arm and a second anchor arm.

3. The fastener of claim 2, wherein the first anchor arm is symmetrically located on an opposing side of the fastener and the axis relative to the second anchor arm.

4. The fastener of claim 2, wherein the first anchor arm is located 180 degrees from the second anchor arm relative to the axis.

5. The fastener of claim 1, wherein the anchor further comprises a cap configured to couple the anchor to the stem.

6. The fastener of claim 1, wherein the extendable portion is parallel to the axis when in the uncoupled position.

7. The fastener of claim 1, wherein the grooves are configured to align with and removably mate to ribs of a seal.

8. The fastener of claim 1, wherein the one or more anchor arms are configured to removably nest in an anchor recess disposed in a lengthwise direction of a seal.

9. The fastener of claim 1, wherein the fastener further comprises a tool rotatable portion disposed between the stem and the shank and configured to receive a wrench.

10. The fastener of claim 1, wherein the shank comprises threads.

11. A seal assembly, comprising:
    a seal comprising a seal body, the seal body comprising a seal bottom surface and a cavity along a lengthwise direction of the seal body; and
    a fastener comprising:
        a shank disposed along an axis;
        a stem protruding up from the shank and disposed along the axis, the stem comprising one or more grooves radially disposed around the axis;
        an anchor coupled to the stem, the anchor comprising:
            one or more anchor arms, wherein each anchor arm comprises a pivot and is coupled to an arm lever, wherein the arm lever is located at a distal end of the fastener, wherein each anchor arm is configured to rotate around the pivot between an uncoupled position and a coupled position upon application of a longitudinal force to the arm lever at the distal end, wherein the longitudinal force is configured to move the arm lever longitudinally inwards relative to the axis and rotate an extendable portion of the anchor arm radially outwards relative to the axis.

12. The seal assembly of claim 11, wherein the one or more anchor arms comprise a first anchor arm and a second anchor arm.

13. The seal assembly of claim 12, wherein the first anchor arm is symmetrically located on an opposing side of the fastener and the axis relative to the second anchor arm.

14. The seal assembly of claim 12, wherein the first anchor arm is located 180 degrees from the second anchor arm relative to the axis.

15. The seal assembly of claim 11, wherein the anchor further comprises a cap configured to couple the anchor to the stem.

16. The seal assembly of claim 11, wherein the extendable portion is parallel to the axis when in the uncoupled position.

17. The seal assembly of claim 11, wherein the grooves are configured to align with and removably mate to ribs of the seal.

18. The seal assembly of claim 11, wherein the one or more anchor arms are configured to removably nest in an anchor recess disposed in a lengthwise direction of a seal.

19. The seal assembly of claim 11, wherein the fastener further comprises a tool rotatable portion disposed between the stem and the shank and configured to receive a wrench.

20. The seal assembly of claim 11, wherein the shank comprises threads.

* * * * *